March 25, 1969 A. GOEKE 3,434,337
APPARATUS FOR CLAMPING AND SEALING PIPES OR THE LIKE
Filed Nov. 7, 1967 Sheet 1 of 2
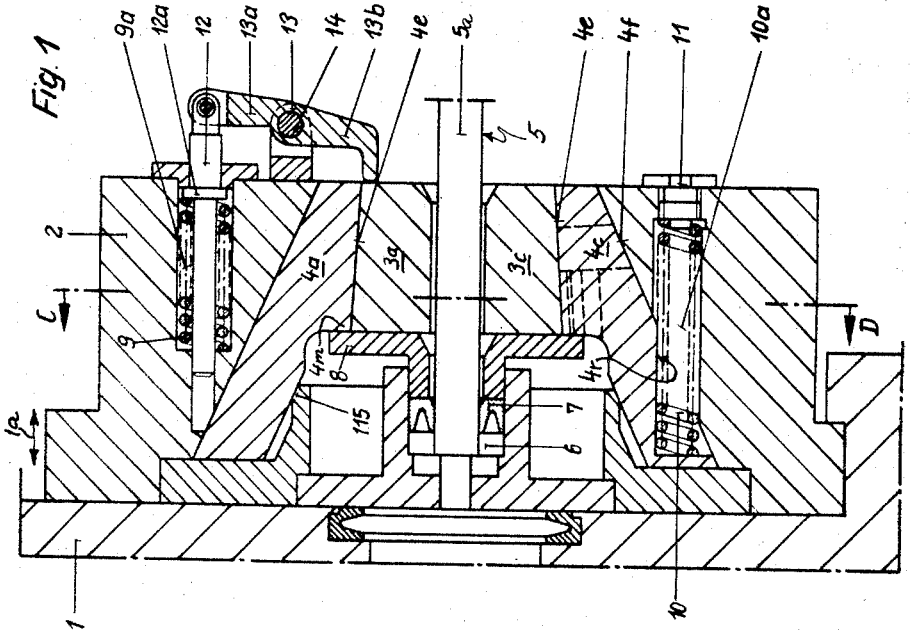
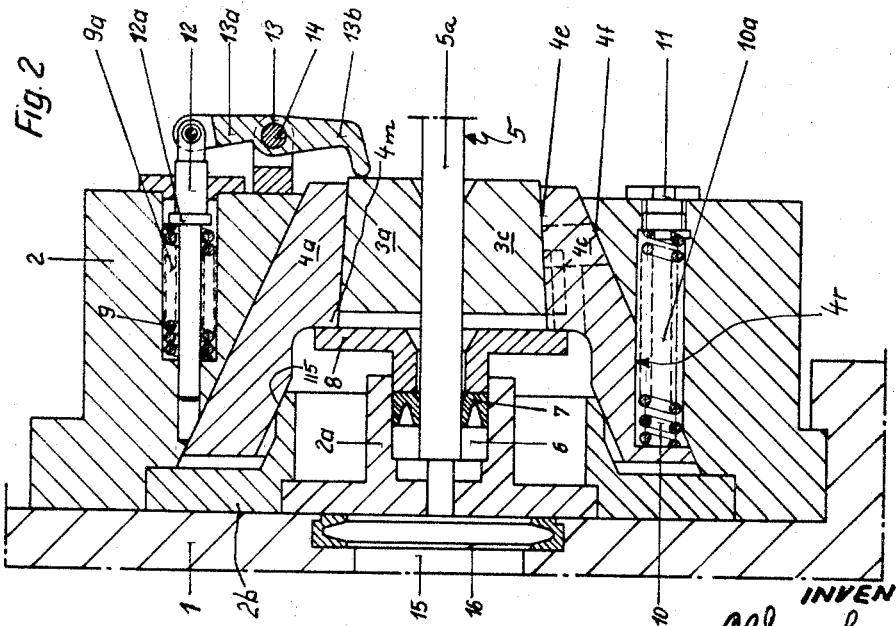
INVENTOR:
Alfons Goeke
by Michael S. Striker
Attorney United States Patent Office 3,434,337
Patented Mar. 25, 1969

3,434,337
APPARATUS FOR CLAMPING AND SEALING PIPES OR THE LIKE
Alfons Goeke, Solingen, Germany, assignor to Th. Kieserling & Albrecht, Solingen, Germany
Filed Nov. 7, 1967, Ser. No. 681,149
Claims priority, application West Germany, Jan. 7, 1967, K 61,113
Int. Cl. G01m 3/28
U.S. Cl. 73—49.8                               10 Claims

ABSTRACT OF THE DISCLOSURE

Apparatus for sealing and clamping end portions of tubular workpieces during testing with a fluid comprises a housing having a cylinder for an annular elastic plunger which surrounds one end portion of the workpiece and is movable by testing fluid axially of the workpiece to effect axial movement of several wedges which in turn effect radial movement of several clamping elements serving to clamp the end portion of the workpiece. The wedges have conical inner faces which bear against complementary conical outer faces of the clamping elements and the taper of these inner and outer faces is such that a self-locking action develops between the wedges and the respective clamping elements. The wedges are further provided with conical outer faces which bear against complementary conical inner faces of the housing and whose taper is such that no self-locking action develops between the housing and the wedges. The clamping elements and the wedges are biased to starting positions by helical springs and the inner and outer faces of the wedges taper in the same direction. The wedges and the clamping elements automatically return to starting positions when the pressure of testing fluid decreases and the clamping elements are slidably coupled to the respective wedges.

Background of the invention

The present invention relates to apparatus for sealing and clamping end portions of pipes or like tubular workpieces, and more particularly to improvements in apparatus which can be utilized in machines for testing of metallic or plastic pipes or tubes by means of a pressure fluid for the presence of leaks or other defects.

Certain presently known pipe sealing and clamping apparatus comprise a head including a hollow conical outer member and a slotted hollow conical inner member provided with cutting edges serving to penetrate into the peripheral surface of a pipe which is inserted into the head. The inner member is movable axially in response to rising pressure of testing fluid and in response to mechanical pressure transmitted by an axially movable part of the head. A conical external face of the inner member thereby slides along a conical internal face of the outer member and causes the cutting edges to penetrate into the material of the workpiece. The extent of penetration depends on the magnitude of fluid pressure, and the cutting edges often leave readily discernible marks which are frequently undesirable, especially if the test is carried out subsequent to final treatment of the peripheral surface. Furthermore, the cutting edges of the slotted inner member cannot be automatically disengaged from the workpiece. Such disengagement is effected by hand or by means of complicated auxiliary equipment, normally by means of hydraulic servo devices or the like.

It is also known to employ a clamping head wherein the slotted inner conical member is surrounded by an axially movable outer conical member which causes the cutting edges of the inner member to penetrate into the peripheral surface of the workpiece. The cutting edges are necessary to prevent axial movement of the inner conical member. Automatic detachment of the inner conical member from the workpiece is not possible and, therefore, such apparatus also require manipulation by hand or the provision of costly, bulky and complicated auxiliary equipment.

Summary of the invention

It is an object of my invention to provide a simple, inexpensive, lightweight and rugged but reliable apparatus which is capable of adequately sealing and clamping workpieces during testing with water or another testing fluid.

Another object of the invention is to provide an apparatus wherein the work-engaging elements need not be provided with cutting edges so that they cannot leave marks in the material of the workpiece.

A further object of the invention is to provide an apparatus of the above outlined character wherein the work-engaging elements are automatically disengaged from the end portion of a workpiece when the pressure of testing fluid is reduced upon completion of a testing cycle.

An additional object of the invention is to provide an apparatus which can be used in machines for testing of short, long, smaller-diameter or larger-diameter tubular workpieces.

A concomitant object of the invention is to provide an apparatus whose clamping and sealing action improves in response to increasing pressure of testing fluid.

Still another object of the invention is to provide an apparatus which can be manipulated by persons having little skill.

My invention is embodied in an apparatus which comprises a carrier preferably constituted by a housing having a centrally located cylinder adapted to accommodate an annular elastic plunger which surrounds one end portion of a tubular workpiece during testing and can move axially of the workpiece in response to increasing pressure of testing fluid in the workpiece to thereby effect axial movement of several wedgelike motion transmitting members surrounding a set of clamping elements which are movable radially into and from clamping engagement with the end portion of the workpiece. The motion transmitting members have conical inner faces which engage complementary faces on the respective clamping elements and whose taper is such that a self-locking action develops between the clamping elements and the motion transmitting members. The latter are further provided with conical outer faces which bear against complementary inner faces of the carrier and whose taper is such that no self-locking action develops between the motion transmitting members and the carrier. When the plunger moves axially in response to increasing pressure of testing fluid which is being admitted into the end portion of a tubular workpiece, the plunger displaces the motion transmitting members so that these members move axially with reference to the carrier and cause radially inward movement of clamping elements into engagement with the peripheral surface of the workpiece. The clamping elements can be automatically disengaged by spring bias when the pressure of testing fluid drops below a certain value.

The novel features which are considered as characteristic of the invention are set forth in particular in the appended claims. The improved apparatus itself, however, both as to its construction and its mode of operation, together additional features and advantages thereof, will be best understood upon perusal of the following detailed description of a specific embodiment with reference to the accompanying drawing.

Brief description of the drawing

FIG. 1 is an axial sectional view of an apparatus which embodies my invention and wherein the clamping elements are shown in starting positions, the section being taken in the direction of arrows as seen from the line A–B of FIG. 4;

FIG. 2 is a similar axial sectional view but showing the clamping elements in operative positions;

*Description of the preferred embodiments*

Figure 3:
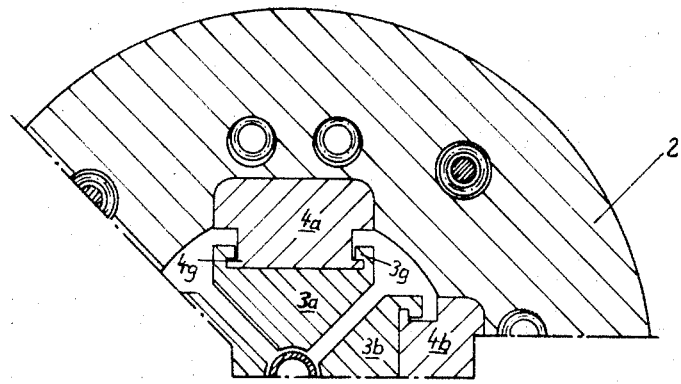
FIG. 3 is a fragmentary transverse sectional view as seen in the direction of arrows from the line C–D of FIG. 1.

Referring first to FIGS. 1 and 2, the numeral 1 denotes a frame member or support for a carrier or housing 2 which accommodates clamping elements 3a–3d (see FIG. 4) and motion transmitting members here shown as wedges 4a–4d. In this embodiment of my invention, the carrier 2 accommodates four clamping elements and four wedges, but their number can be higher or lower. That end portion of a pipe or tube 5 which is to be clamped by the elements 3a–3d is shown at 5a.

The carrier 2 includes a sleeve-like central portion or cylinder 2a which defines a cylindrical chamber or space 6 for an elastic annular sealing ring or plunger 7 located inwardly of an annular intermediate member or ring 8. The taper of the conical inner faces 4e of the wedges 4a–4d and the taper of the outer faces of the clamping elements 3a–3d is about 4 degrees. The taper of the outer faces 4f of the wedges 4a–4d is about 20 degrees. The inner faces 4e abut against the outer faces of the associated clamping elements and the outer faces 4f are in abutment with complementary conical inner faces of the carrier 2. The taper of the outer faces 4f can be less or more than 20 degrees, depending on the coefficient of friction between the wedges 4a–4d and the carrier 2; all that counts is that this taper should be amply sufficient to avoid self-locking of the wedges with reference to the carrier. On the other hand, the taper of the inner faces 4e is always below the upper self-locking limit.

The carrier 2 is provided with bores or holes 9a, 10a for prestressed helical springs 9, 10 which form part of means for automatically returning the clamping elements 3a–3d and the wedges 4a–4d to their initial or starting positions shown in FIG. 1. The outer ends of the bores 10a are closed by threaded plugs 11 which mesh with the housing 2. These plugs serve as retainers for the outer end convolutions of springs 10, and the innermost convolutions of springs 10 bear against the bottom surfaces in recesses or cutouts 4r machined into the outer faces 4f of the wedges 4a–4d so that the springs 10 tend to move the wedges axially of and toward the bottom wall of the cariter 2. The innermost convolutions of the springs 9 bear against shoulders formed on the carrier 2 at the inner ends of the respective bores 9a, and the outermost convolutions of the springs 9 bear against collars 12a provided on rods 12 which are axially movable in the bores 9a. The outer end of each rod 12 is pivotally connected to one arm 13a of a two-armed lever 13 which is fulcrumed on the housing 2, as at 14. The outer arms 13b of the levers 13 respectively bear against the right-hand sides of the clamping elements 3a–3d.

The frame member 1 has an outlet 15 for admission of testing fluid into the end portion 5a of the tube 5 through a registering opening in the bottom wall of the carrier 2. The outlet 15 has an enlarged portion which receives an annular sealing gasket 16 bearing against the carrier 2 to prevent leakage of testing fluid.

The clamping elements 3a–3d are slidably coupled to the respective wedges 4a–4d so that they cannot fall out of the carrier 2 when the pipe 5 is withdrawn. The coupling means (see FIG. 3) comprises cooperating claws or jaws 3g and 4g respectively provided on the elements 3a–3d and wedges 4a–4d. A second sleeve-like portion 2b of the carrier 2 provides a set of guide surfaces 115 for the wedges 4a–4d. The portion 2b surrounds the portion 2a. Furthermore, the wedges 4a–4d have motion receiving portions 4m which can be engaged by the ring 8 to move axially and away from the portion 2a.

Figure 4:
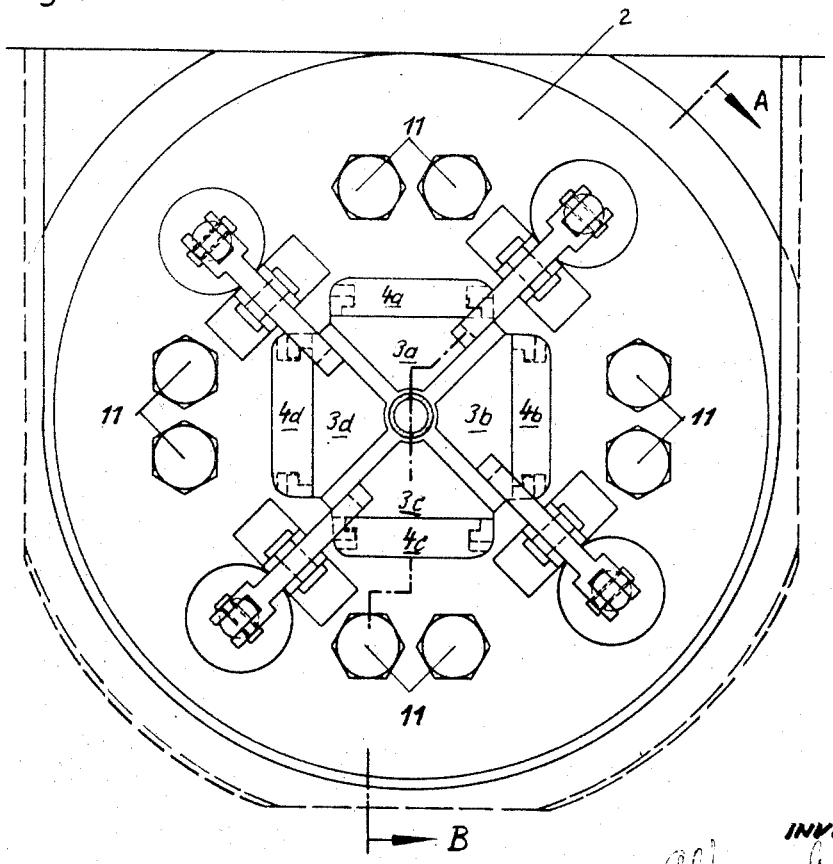
FIG. 4 is an elevational view of the apparatus as seen from the right-hand side of FIG. 1 of FIG. 2.

FIG. 4 shows that the apparatus comprises four levers 13 and eight plugs 11.

The operation is as follows:

A machine for testing of pipes 5 comprises two apparatus of the type shown in FIGS. 1–4, one for each end portion of a pipe. One of the frame members 1 is stationary and the other frame member is movable axially of a pipe toward and away from the other frame member. This is indicated in FIG. 1 by a double-headed arrow 1a. It is also possible to employ a machine with two reciprocable frame members, especially if the machine is to be used for testing of very long as well as very short tubular workpieces.

Once the end portions 5a of a pipe 5 are properly received in the sleeve-like portions 2a of the respective carriers 2, the testing machine admits testing fluid through the outlet 15 so that such fluid expels air from the interior of the pipe. The testing fluid is normally water or another liquid. A shutoff valve (not shown) in the second apparatus for the right-hand end portion of the pipe 5 (as viewed in FIG. 1 or 2) is then closed by hand or automatically so that the pressure in the pipe rises because the machine includes a pump or other suitable pressure generating means which tends to force the fluid into the pipe. Such fluid acts upon the sealing ring 7 which is deformed into sealing engagement with the portion 2a and with the end portion 5a of the pipe 5. At the same time, the ring 7 moves axially and away from the outlet 15 to displace the intermediate ring 8 which latter, in turn, displaces the wedges 4a–4d and with some delay also the clamping elements 3a–3d. This insures a very satisfactory clamping action between the elements 3a–3d and the end portion 5a for reasons which will be readily apparent by comparing the positions of parts 3a–3d and 4a–4d in FIG. 1 (starting positions) and in FIG. 2 (operative or clamping positions). If the fluid pressure continues to rise, the carrier 2 undergoes expansion and allows some additional rightward movement of elements 3a–3d which produces a stronger clamping action. The wedges 4a–4d cannot return to the positions shown in FIG. 1 even though the taper of their outer faces 4f is well beyond the upper self-locking limit. This is due to the fact that the wedges are biased by fluid through the intermediary of rings 7 and 8, and also because the taper of inner faces 4e is below the upper self-locking limit so that the clamping elements 3a–3d (which are in strong clamping engagement with the end portion 5a of the pipe 5) also hold the wedges 4a–4d against movement back to starting positions.

The springs 9 and 10 store energy duirng movement of wedges 4a–4d and clamping elements 3a–3d from the positions shown in FIG. 1. When the testing cycle is completed, the pressure of fluid in the pipe 5 and in the chamber 6 is reduced and the carrier 2 contracts to shift the wedges 4a–4d in a direction to the left, as viewed in FIG. 1, because the taper of outer faces 4f is above the upper self-locking limit. Such return movement of wedges 4a–4d is assisted by the bias of springs 10. The clamping elements 3a–3d return to starting positions under the bias of springs 9 which act on the levers 13 so that the end portion 5a is released and can be withdrawn from the portion 2a and from between the clamping elements. If the frame member 1 is reciprocable, the pipe 5 remains stationary and the clamping elements 3a–3d are withdrawn with the carrier 2 to the left and beyond the end portion 5a.

When the pressure of testing fluid is high enough to maintain the sealing ring 7 in the axial position shown in FIG. 2, this ring provides a fluidtight seal around the end portion 5a and the elements 3a–3d hold the pipe 5 against axial movement. The provision of slightly conical inner faces 4e on the wedges 4a–4d and of similarly tapered outer faces on the clamping elements 3a–3d insures a satisfactory clamping action without necessitating the provision of cutting edges on the clamping elements. The taper of outer faces 4f on the wedges 4a–4d insures that the apparatus is automatically disengaged from the end portion 5a when the pressure of testing fluid drops below a predetermined value.

During movement from starting positions shown in FIG. 1, the wedges 4a–4d and the clamping elements 3a–3d move slightly beyond the right-hand end face of the carrier 2, as viewed in FIGS. 1 or 2. In the absence of the levers 13 and springs 9, 10, an attendant could move the parts 3a–3d and 4a–4d back to the positions of FIG. 1 by exerting pressure against the projecting portions of such parts. The provision of levers 13 and springs 9, 10 is desirable if the apparatus is to be operated in a fully automatic way. The springs 9, 10 store energy during axial movement of the sealing ring 7 to the position of FIG. 2 and dissipate such energy to return the parts 3a–3d and 4a–4d to starting positions in response to a requisite drop in the pressure of testing fluid.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

I claim:

1. Apparatus for clamping and sealing end portions of tubular workpieces during testing of workpieces by means of pressurized fluid, comprising a carrier; annular sealing means mounted in the carrier to surround one end portion of a workpiece and to move axially of the workpiece in response to admission of testing fluid into the thus surrounded end portion; a plurality of clamping elements movable radially of that workpiece whose end portion is surrounded by said sealing means; and a plurality of motion transmitting members mounted in the carrier for axial movement in response to axial movement of said sealing means to thereby move said clamping elements radially inwardly into clamping engagement with the end portion, said motion transmitting members having tapering inner faces abutting against complementary outer faces of said clamping elements and tapering outer faces abutting against complementary inner faces of said carrier.

2. Apparatus as defined in claim 1, wherein said motion transmitting members resemble wedges and the taper of their outer faces exceeds the taper of their inner faces.

3. Apparatus as defined in claim 2, wherein the taper of said last mentioned inner faces is below the upper limit of self-locking engagement between said motion transmitting members and the respective clamping elements.

4. Apparatus as defined in claim 2, wherein the taper of said last mentioned outer faces is above the upper limit of self-locking engagement between said motion transmitting members and said carrier.

5. Apparatus as defined in claim 2, wherein the inner and outer faces of said motion transmitting members taper in the same direction.

6. Apparatus as defined in claim 5, wherein said clamping elements and said motion transmitting members are movable to and from starting positions which they assume in the absence of fluid pressure against said sealing means, and further comprising resilient means for biasing said motion transmitting members and said clamping elements to starting positions.

7. Apparatus as defined in claim 5, further comprising coupling means provided between said clamping elements and the respective motion transmitting members to hold said elements against angular movement with reference to said sealing means.

8. Apparatus as defined in claim 7, wherein said coupling means comprises cooperating jaws provided on said clamping elements and the respective motion transmitting members to permit relative movement between said elements and said members in the axial direction of said sealing means.

9. Apparatus as defined in claim 5, wherein said sealing means consists of elastic material and is reciprocable in a sleeve forming part of said carrier, and further comprising an annular intermediate member interposed between said sealing means and said motion transmitting members.

10. Apparatus as defined in claim 5, wherein the number of said motion transmitting members equals the number of said clamping elements and wherein said carrier comprises a housing which is reciprocable axially of the workpiece.

References Cited

UNITED STATES PATENTS 3,179,127   4/1965   Terry _____ 73—49.6 XR

FOREIGN PATENTS 809,857   5/1951   Germany.
1,120,760   12/1961   Germany.

LOUIS R. PRINCE, *Primary Examiner.*

JEFFREY NOLTON, *Assistant Examiner.*

U.S. Cl. X.R.

279—121